A. J. PURDY.
MOTOR CYCLE.
APPLICATION FILED JAN. 23, 1918.
1,300,772.
Patented Apr. 15, 1919.
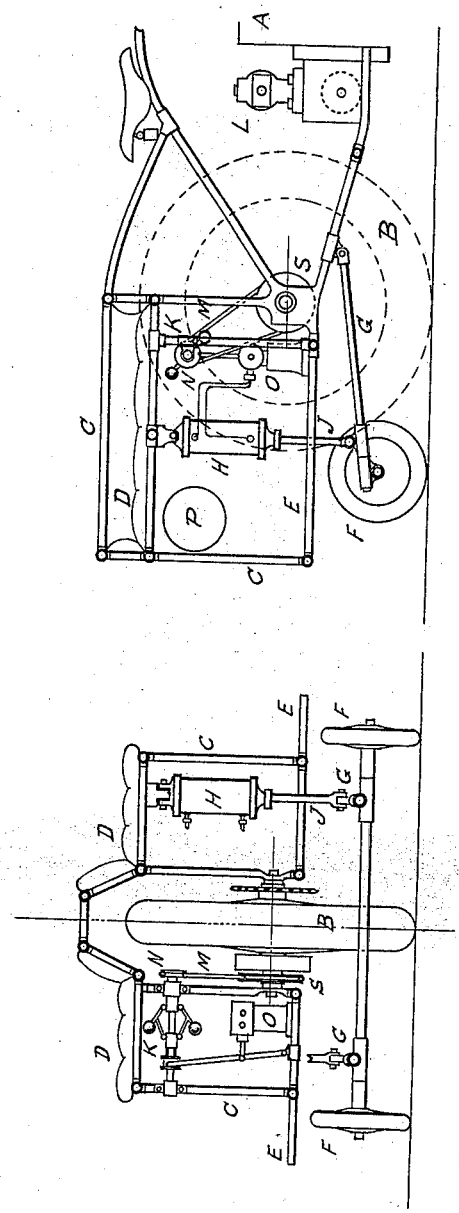
WITNESSES:
INVENTOR.
A. J. Purdy.

UNITED STATES PATENT OFFICE.

ANDREW J. PURDY, OF SAN FRANCISCO, CALIFORNIA.

MOTOR-CYCLE.

1,300,772.   Specification of Letters Patent.   Patented Apr. 15, 1919.

Application filed January 23, 1918. Serial No. 213,327.

*To all whom it may concern:*

Be it known that I, ANDREW JAMESON PURDY, a citizen of Great Britain, residing at 106 Sixth street, San Francisco, California, have invented a new and useful Improvement in Motor-Cycles, of which the following is a specification.

This invention relates to motor cycles and consists of an arrangement of side seats placed at the sides of and over the back wheel of a motor cycle together with supporting side wheels fitted underneath these seats, and of having means for raising and lowering the supporting side wheels automatically by gearing as the speed of the motor cycle changes. The idea being that the side wheels are kept down on the ground by pressure in an air cylinder when the machine is standing and at rest and holds it steady in that position while a passenger mounts onto the seat and will also continue in that position and support the machine after it is started and commences to travel until such time as the speed increases sufficiently to actuate the governor connected by gearing with the back axle which then operates the air valve and admits the air under pressure into the opposite end of the cylinder which then raises the side wheels up clear off the ground and holds them there as long as the speed is maintained.

As soon as the speed is reduced and the proper slow speed limit is reached, the governor re-acts and reverses the air valve when the side wheels come down again to their original position.

Referring to the drawings, Figure 1 is a side elevation of the rear part of a motor cycle showing the general arrangement as herein described.

Fig. 2 is an end view of the same.

The same letter used in each figure denotes the same part.

A is the motor. B the back wheel shown dotted in Fig. 1 for clearness. C, C, C is an extension of the main frame of the motor cycle on which is built the side seats D, D, placed in a fore and aft direction and back to back. E is the footboard and will be recessed in path of side wheels. F is the side wheel on the end of the hinged lever G, H the air cylinder one end being attached to the upper part of the frame extension and J the piston rod connecting the cylinder with the side wheel by means of the hinged lever G. L is the air pump driven by gearing from the motor. K the governor connected by belt M and pulley N to the pulley S on the back axle. O is the air valve from which pipes lead to the pressure tank P and to the top and bottom of the air cylinder H. A pipe also leads from the pump L to the pressure tank P.

What I claim is:—

1. In a motor cycle, side supporting wheels pivotally connected with the frame of the motor cycle, a governor responsive to the speed of the motor cycle, means controlled by said governor for raising and lowering said supporting wheels.

2. In a motor cycle, the combination with side supporting wheels, of an air cylinder, means for raising and lowering said supporting wheels operated by air pressure in said cylinder, a governor connected by gearing with the motor cycle, means operated by said governor to automatically control the admission of pressure to said cylinder.

A. J. PURDY.

Witnesses:
  R. A. MILLER,
  CHARLES D. O'CONNOR.

Copies of this patent may be obtained for five cents each, by addressing the "Commissioner of Patents, Washington, D. C."